United States Patent Office 2,764,546
Patented Sept. 25, 1956

2,764,546

OIL-BASE DRILLING FLUIDS AND METHODS OF DRILLING WITH SAME

Charles J. Engle, Bartlesville, Okla., assignor to Phillips Petroleum Company, a corporation of Delaware No Drawing. Application September 21, 1953, Serial No. 381,479

8 Claims. (Cl. 252—8.5)

This invention relates to oil-base drilling fluids and to methods of drilling with same. In a more specific aspect this invention relates to oil-base drilling fluids possessing improved properties, especially a low fluid loss.

In the art of drilling wells to tap subterranean deposits, it is customary to use a liquid or semi-liquid medium in the bore hole. Particularly in the boring of holes with rotary drills, it is necessary to circulate a specially prepared drilling fluid through the cutting region and the drill hole. The drilling fluid must act as a liquid medium of controlled viscosity for removing the cuttings from the bore hole; it must prevent excessive amounts of fluid from flowing from the hole into surrounding formations by depositing on the wall of the hole a thin but substantially impervious filter cake; it must possess a gel structure of sufficient strength to hold in suspension all of the solids, particularly during any time the fluid is not circulating; and it must serve as a weighting material exerting sufficient pressure to counterbalance any pressure exerted by water, gas, oil, or other fluid from the structures penetrated and to prevent caving or other intrusion into the drill hole.

These requirements are conventionally met by making a dispersion in water of suitable dissolved and suspended solids of such type and in such concentration that satisfactory weight and consistency, and necessary colloidal properties, especially solid-suspension and plastering properties, are established.

In some applications, however, these aqueous drilling fluids are not satisfactory. For example, in penetrating formations containing salt water, particularly those under high pressures, the salt water becomes mixed with the fluid, causing coagulation and flocculation of the colloidal material in the drilling fluid with consequent loss of necessary characteristics. In the drilling of some shale formations, aqueous drilling fluids are not suitable because the shales swell and disintegrate on the absorption of water, so that the bore hole becomes closed, clamping the drill pipe when in the hole. Aqueous drilling fluids are also unsatisfactory in some cases in which it is desired to obtain specimens of cores, particularly from low-pressure formations. In these cases, the aqueous drilling fluids contaminate the cores, making interpretation of the core analyses very uncertain, particularly with regard to connate water content.

These difficulties, and other problems resulting at least in part from the water content of the drilling fluid, may be overcome or alleviated through the use of a nonaqueous drilling fluid. Oils, such as selected petroleum-oil fractions, blends of petroleum-oil fractions with asphalt or other viscous oils, residual portions of crude petroleum, and some crude petroleums, may be used as liquid media in the nonaqueous drilling fluids.

To the oils are added one or more of various finely powdered materials for increasing the weight of the mixture and for imparting colloidal and other desired properties to the mixture. Materials commonly used for increasing the weight of the oil-base fluids include limestone, barite, lead sulfide, oyster shells, and the like, in a fine subdivided state. The materials used to impart colloidal properties include oil-wetted or oil-wettable substances such as carbon black, or other very highly dispersed voluminous materials such as magnesium oxide, diatomaceous earth, and the like.

By proper selection of types and proportions of oils and added materials, it is in some cases possible to secure relatively satisfactory oil-base drilling fluids. However, all these mixtures are deficient to some extent in the so-called colloidal properties. The loss of oil from the drilling fluid by inadequate sealing of the bore-hole surface, deposition of an excessively thick filter cake on the wall of the bore hole, and inadequate power to hold the various weighting materials and drilling cuttings in suspension, are manifestations of lack of adequate colloidal properties.

An object of this invention is to produce an improved oil well drilling fluid or mud.

Another object of this invention is to produce an improved oil-base drilling fluid or mud.

Still another object is to make an improved oil-base drilling fluid having low fluid loss properties.

Other objects and advantages will be apparent to those skilled in the art from a careful study of the disclosure to follow.

I have now discovered that an oil-base drilling fluid having improved properties, particularly a low fluid loss, can be made by forming a mixture of the oil and a soap of a polyvalent metal and an organic carboxylic acid, said acid having from 8 to 18, inclusive, carbon atoms per molecule. An important feature of my discovery is that greatly improved fluid loss properties are achieved by heating the mixture made as stated above to a temperature of at least 80° C. before the mixture is used as a drilling fluid.

The oils used in preparing said mixture are usually petroleum oils, although other oleaginous materials such as vegetable and animal oils can be used.

The oils used, in any event, should contain at least some material boiling above the gasoline boiling range, i. e. above 400° F. at atmospheric pressures. Oils with too high a content of high-volatile hydrocarbons in the gasoline boiling range are undesirable because of the danger of fire, and because their viscosity is generally low. Preferred oils are topped crude oils, gas oils, diesel fuels, kerosene and the like.

The soaps which are useful in these applications are soaps of polyvalent metals and suitable metals include those of group II, group III, group VI, group VII, and group VIII of the periodic table. Polyvalent metals which are preferred are calcium, barium, and strontium of group II, aluminum of group III, chromium of group VI, and iron, nickel and cobalt of group VIII. The trivalent metals, aluminum, iron, chromium, cobalt, and nickel are especially preferred.

The acidic group associated with the metal is an organic group of such nature that the metal derivatives will dissolve to at least a limited extent in the oil to make a true or a colloidal solution. The acid groups are derived from those organic carboxylic acids having from 8 to 18, inclusive, carbon atoms per molecule. The saturated acids in this range are believed to be most effective when used in conjunction with a paraffinic-base drilling fluid, and the unsaturated acids are believed to be better suited to use with asphaltic-base drilling fluids. Derivatives of these acids are also effective, such as halogen, hydroxy, sulfuric and phosphoric acid derivatives. The soap-type compounds which are useful in my invention are considered to be the reaction product of the described organic carboxylic acids and the polyvalent metals listed above.

Specific examples of these soap-type compounds are aluminum octoate, aluminum nonoate, aluminum decanoate, aluminum undecanoate, aluminum dodecanoate, ferric octoate, chromic octoate, aluminum stearate, zinc stearate, calcium stearate, magnesium stearate, lead stearate, barium stearate, aluminum tridecanoate, aluminum tetradecanoate, aluminum pentadecanoate, aluminum palmitate, and aluminum margarate. Other specific examples of the soap-type compounds which are effective in my invention are feric decanoate, chromic dodecanoate, cobaltic tetradecanoate, cobaltic octoate, nickelic octoate, nickelic pentadecanoate, and chromic palmitate.

By the practice of this invention, soap-type compounds, such as aluminum octoate, is mixed with an oil, such as a crude oil or a diesel oil, and the resulting mixture used as a drilling fluid in well drilling operations. I have found that important and unexpected advantages, particularly a low fluid loss, results when aluminum octoate is used as an additive to an oil-base drilling fluid as described. However, when the soap-type compound used is formed from an acid having greater than 8 carbon atoms per molecule, I have found that to achieve the desired advantages of a low fluid loss, the mixture of the oil and the soap-type compound must be heated to at least 80° C., preferably from 80 to 200° C. The mixture can be heated up to a temperature just below that at which the soap-type compound decomposes and the decomposition temperature of aluminum octoate, for example, is believed to be between 135 and 183° C. In the case of aluminum octoate the drilling fluid has been found to have even a more greatly lowered fluid loss when the heating step is incorporated. After the mixture of oil and soap-type compound has been heated, the drilling fluid thus formed can be used at room or ambient temperatures and it has been found that this drilling fluid retains its low fluid loss characteristics even at subsequently elevated temperatures.

The novel and improved drilling fluids of this invention can be used alone as a drilling mud in well known drilling operations, although if desired the usual weighting agents, clay and the like, can also be incorporated. Of course, the cuttings from the earth formations penetrated by the drilling bit will be in the drilling fluid.

The optimum amount of soap-type compound to be incorporated in the oil depends on many independent variables, such as the constituents of the soap-type compound and the characteristics of the particular oil used. In general, the influence of very small amounts of the soap-type compound, that is, less than 0.1 pound per barrel of oil, is limited. However, the influence increases most rapidly with the proportion used. The amount of such soap-type compounds can be as little as 0.1 pound per barrel and the upper limit is that quantity above which the viscosity of the drilling fluid increases to such an extent that the fluid cannot be circulated in the well. Since in all drilling operations, the drilling fluid engineer makes frequent tests to determine the proper quantities of materials to be added to the drilling fluid, it is within the skill of the art, once having been given the present disclosure, to choose the desired quantity of soap-type compound be added to the oil-base drilling fluid in any given situation.

Various drilling fluids were tested according to the Standard Drilling Fluids Test Procedure, A. P. I. Code 29, and the data from the tests is presented in the tables which follow. This data shows some of the properties of some preferred drilling fluids of the present invention and illustrates how these properties can be varied by a choice of materials, quantity of additives and methods of preparation.

TABLE I

*Effects of aluminum octoate and heat on API Code 29 properties of Okmulgee diesel fuel oil*

| Run No. | Weight of Aluminum Octoate, #/Bbl. | Heat [1] Treating Temperature, °C. | Room Temperature Data | | | Elevated Temperature Data | | | | | |
|---|---|---|---|---|---|---|---|---|---|---|---|
| | | | Viscosity (centipoises) | Gel Strength (grams), 0–10 min. | Fluid loss, cc., 30 min., 100 p. s. i. | Test Temperature, °C. | Viscosity (centipoises) | Gel Strength (grams), 0–10 min. | Fluid loss, cc., 30 min., 100 p. s. i. | Test Temperature, °C. | Fluid loss, cc., 30 min., 100 p. s. i. |
| 0 | | | 1.5 | 0–0 | 200/17 sec | | | | | | |
| 1 | 5.3 | 51 | 2.0 | 0–0 | 186/7 min | | | | | | |
| 2 | 5.3 | 65 | 55.0 | 5–10 | 1.0 | | | | | 60 | 28.1 |
| 3 | 0.17 | 87 | 3.0 | 0–0 | 13.8 | | | | | 60 | 5.4 |
| 4 | 0.44 | 87 | 20.0 | 0–2 | 5.0 | 71 | 6 | 0–0 | | 60 | 5.4 |
| 5 | 0.88 | 87 | 18.0 | 0–0 | 3.6 | 70 | 5 | 5–5 | | 58 | 4.3 |
| 6 | 1.70 | 87 | 84.5 | 5–15 | 2.0 | 70 | 31 | 5–5 | | 58 | 2.2 |
| 7 | 3.40 | 87 | high | 15–20 | 3.8 | 73 | 23 | 5–5 | | 65 | 3.0 |
| 8 | 5.10 | 87 | high | 5–15 | 4.5 | 72 | 58 | 40–40 | | | |
| 9 | 2.7 | 135 | 70 | 10–20 | 2.0 | | | | | | |
| 10 | 1.1 | 147 | 22.0 | 0–0 | 11.5 | | | | | | |
| 11 | 2.7 | 183 | 3.0 | 0–0 | 21.0 | | | | | | |

[1] Time at heat treating temperature was 60 minutes, except runs 2, 9, 10 and 11 wherein time was 45 minutes.

TABLE II

*Effects of aluminum octoate and heat on API Code 29 properties of four crude oils*

| Run No. | Crude Oil | API Gravity | Crude Hempel [1] Classification | API Code 29 Properties of Untreated Crude Oil | | | Weight of Aluminum Octoate, #/bbl. | Heat [2] Treating Temperature, °C. | API Code 29 Properties | | |
|---|---|---|---|---|---|---|---|---|---|---|---|
| | | | | Viscosity (centipoises) | Gel Strength (grams), 0–10 min. | Fluid loss, cc., 30 min., 100 p. s. i. | | | Viscosity (centipoises) | Gel Strength (grams), 0–10 min. | Fluid loss, cc., 30 min., 100 p. s. i. |
| 1 | McFadden | 23.5 | N | 18 | 0–0 | 184/60 sec | 1.0 | 100 | 31 | 0.0 | 18 |
| 2 | Burbank | 36.7 | I | 15 | 0–0 | 118 | 1.0 | 100 | 18 | 0–0 | 3.0 |
| 3 | West Edmond | 41.2 | I | 7 | 0–0 | 122/45 sec | 1.0 | 100 | 24 | 0–0 | 8 |
| 4 | "C" Zone Venezuela | 54.2 | P | | | Rapid | 0.5 | 100 | 4 | 0–0 | 19.5 |

[1] N=naphthenic oil; I=intermediate oil; P=paraffinic oil.
[2] Time at heat treating temperature was 90 minutes.

TABLE III

*Effects of aluminum stearate [1] and heat on API Code 29 properties of Okmulgee diesel fuel oil*

| Run No. | Weight of Aluminum Stearate, #/bbl. | Heat Treating Temperature, °C. | Time at Heat Treating Temperature (min.) | Room Temperature Data ||| 
|---|---|---|---|---|---|---|
| | | | | Viscosity (centipoises) | Gel Strength (grams), 0-10 min. | Fluid Loss cc., 30 min. 100 p. s. i. |
| 1 | 17.5 | 27 | 120 | 2.0 | 0-0 | 182/4 min. |
| 2 | 17.5 | 83 | 120 | 35.0 | 10-20 | 80.0 |
| 3 | 17.5 | 112 | 120 | 14.0 | 10-20 | 40.0 |
| 4 | 17.5 | 147 | 120 | 9.0 | 10-20 | 36.0 |
| 5 | 17.5 | 177 | 120 | +140.0 | 100-100 | 6.0 |

[1] No. 132 from the Witco Chemical Company.

TABLE IV

*Effects of soaps of polyvalent metals and stearic acid and heat on API Code 29 properties of a 10W lubricating oil*

| Run No. | Additive | Wt. of Additive, #/bbl. | API Code 29 Properties With No Heat Treatment ||| API Code 29 Properties After Heat [1] Treatment at 170° C. ||| API Code 29 Properties After Heat [1] Treatment at 170° C.; 50 cc. H₂O Added to Sample Stirred and Tested |||
|---|---|---|---|---|---|---|---|---|---|---|---|
| | | | Viscosity (centipoises) | Gel Strength (grams), 0-10 min. | Fluid Loss, cc., 30 min., 100 p. s. i. | Viscosity (centipoises) | Gel Strength (grams), 0-10 min. | Fluid Loss, cc., 30 min., 100 p. s. i. | Viscosity (centipoises) | Gel Strength (grams), 0-10 min. | Fluid Loss, cc., 30 min., 100 p. s. i. |
| 1 | | | 44 | 0-0 | 200/6.5 mm. | | | | | | |
| 2 | Aluminum Stearate | 17.5 | 68 | 0-0 | 68 | 78 | 0-5 | 8 | 102 | 0-20 | 3.5 |
| 3 | do | 17.5 | 55 | 0-0 | 140 | 60 | 0-0 | 26 | 105 | 0-10 | 22.5 |
| 4 | do | 17.5 | 59 | 0-0 | 184 | 79 | 0-5 | 29 | 120 | 0-20 | 52.0 |
| 5 | do | 17.5 | 50 | 0-0 | 55 | 81 | 0-0 | 19 | 140 | 5-20 | 7.0 |
| 6 | do | 17.5 | 68 | 0-0 | 122 | 63 | 0-0 | 22 | 102 | 0-10 | 40.0 |
| 7 | Calcium Stearate | 17.5 | 80 | 0-0 | 90.0 | 81 | 0-10 | 7.5 | +140 | 60-90 | 5.0 |
| 8 | Barium Stearate | 17.5 | 62 | 0-0 | 65.0 | 60 | 0-0 | 2 drops | 96 | 0-5 | 3.0 |

[1] Heat treatment was for 16 hours.

TABLE V

*Effects of soaps of polyvalent metals and stearic acid without heat treatment on API Code 29 properties of Burbank crude oil*

| Run No. | Additive | Weight of Additive, #/bbl. | Viscosity (centipoises) | Gel Strength (grams), 0-10 min. | Fluid Loss, cc., 30 min., 100 p. s. i. |
|---|---|---|---|---|---|
| 1 | | | | | 200 |
| 2 | Zinc Stearate | 17.5 | 13.0 | 0-0 | 145 |
| 3 | Calcium Stearate | 17.5 | 4.0 | 0-0 | 78 |
| 4 | Magnesium Stearate | 17.5 | 5.0 | 0-0 | 153 |
| 5 | Cadmium Stearate | 17.5 | | 0-0 | 14.5 |
| 6 | Lead Stearate | 17.5 | 4.0 | 0-0 | 114 |
| 7 | Barium Stearate | 17.5 | 4.0 | 0-0 | 115 |

The beneficial effects of the aluminum octoate and heating on the colloidal properties of Okmulgee diesel oil as an oil-base drilling fluid are apparent from the data in Table I. The elevated temperature data therein shows that these beneficial effects are not lost when the prepared drilling fluid is again heated, as would be normal in a drilling operation.

Table II presents data which shows that the API Code 29 properties, particularly low fluid loss, of 4 widely different oils are benefited by the addition of aluminum octoate and the heating treatment.

The data in Table III demonstrates that soap-type compounds of polyvalent metals and organic carboxylic acids having as many as 18 carbon atoms per molecule e. g., stearic acid, benefit the API Code 29 properties, particularly the fluid loss properties of diesel oil when heated to above 80° C.

The data in Table IV demonstrates clearly the greatly improved fluid loss properties of a 10W lubricating oil by the addition of aluminum stearate and heating the mixture of oil and the soap-type compound. This data further demonstrates that the low fluid loss benefit is not lost when water is present as a contaminant in the drilling fluid.

The data in Table V reflects that the API Code 29 properties, particularly fluid loss properties, of Burbank crude oil is benefited by the addition, without heat treatment, of soap-type compounds of various Group II metals and stearic acid.

Various methods of preparing and using my drilling fluids will be obvious to those skilled in the art. The drilling fluid can be prepared and then shipped to the site of use. Usually, however, it will be more convenient to prepare the drilling fluid at the site of the well drilling operations. There the selected oil and soap-type compound can be mixed in mixing tanks or even in the mud pit itself. Preferably, the materials are passed through mixing pumps, or otherwise subjected to agitation, to insure intimate admixture, with each other. In well drilling operations it is normal for the drilling fluid to be heated in the course of its circulation in and out of the well. However, in the vast majority of well drilling operations the drilling fluid will thereby be heated to less than 80° C. and in a preferred embodiment of my invention the drilling fluid is prepared before use as outlined above.

It will be apparent that I have achieved the objects of my invention in providing a novel and improved oil base drilling fluid. While the invention has been described in connection with present preferred embodiments thereof, it is to be understood that this description is illustrative only and is not intended to limit the invention.

I claim:

1. A process for preparing a circulatable oil-base drilling fluid which comprises the steps of mixing oil, weighting material, and at least 0.1 pound of an oil-dispersible soap of a polyvalent metal and a saturated organic carboxylic acid having 8 to 18, inclusive, carbon atoms per molecule per barrel of oil, and heating the resulting mixture to a temperature in the range from about 80° C. to below that temperature at which said soap decomposes for a period of time sufficient to substantially lower the fluid loss characteristic of the said mixture.

2. A process for preparing a circulatable oil-base drilling fluid having improved fluid loss characteristics which comprises the steps of mixing oil, weighting material, and at least 0.1 pound of an oil-dispersible soap of a polyvalent metal and a saturated organic carboxylic acid having 8 to 18, inclusive, carbon atoms per molecule per barrel of oil, and heating the resulting mixture for a period of time of at least forty-five minutes at a temperature in the range from about 80° C. to below that temperature at which said soap decomposes.

3. A process for preparing a circulatable oil-base drilling fluid which comprises the steps of mixing a paraffinic oil, weighting material, and at least 0.1 pound per barrel of oil of an oil-dispersible soap of a polyvalent metal and a saturated aliphatic carboxylic acid having 8 to 18, inclusive, carbon atoms per molecule, said polyvalent metal being selected from the group of metals consisting of aluminum, calcium, barium, strontium, chromium, iron, nickel and cobalt, and heating the resulting mixture to a temperature in the range from about 80° C. to below that temperature at which said soap decomposes for a period of time sufficient to substantially lower the fluid loss characteristic of the said mixture.

4. The process of claim 3 wherein said soap is aluminum octoate.

5. The process of claim 3 wherein said soap is barium stearate.

6. The process of claim 3 wherein said soap is calcium stearate.

7. The process of claim 3 wherein said soap is aluminum nonoate.

8. The process of claim 3 wherein said soap is aluminum deconoate.

References Cited in the file of this patent
UNITED STATES PATENTS

| | | |
|---|---|---|
| 1,902,635 | Gebhardt | Mar. 21, 1933 |
| 1,975,582 | Klemgard | Oct. 2, 1934 |
| 2,099,825 | Rolshausen et al. | Nov. 23, 1937 |
| 2,297,660 | Mazee | Sept. 29, 1942 |
| 2,623,015 | Fischer | Dec. 23, 1952 |
| 2,675,352 | Dawson | Apr. 13, 1954 |

OTHER REFERENCES

Boner: Metallic Soaps for Thickening Mineral Oils, article in Industrial and Engineering Chemistry, vol. 29, pages 58, 59 and 60, January 1937.